United States Patent
Hoshino (10) Patent No.: US 12,039,253 B2
(45) Date of Patent: Jul. 16, 2024

(54) SCENARIO GENERATION APPARATUS, SCENARIO GENERATION METHOD, AND COMPUTER-READABLE RECORDING MEDIUM

(71) Applicant: NEC Corporation, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/797,821

(22) PCT Filed: Feb. 21, 2020

(86) PCT No.: PCT/JP2020/007135
§ 371 (c)(1),
(2) Date: Aug. 5, 2022

(87) PCT Pub. No.: WO2021/166231
PCT Pub. Date: Aug. 26, 2021

(65) Prior Publication Data
US 2023/0053344 A1    Feb. 23, 2023

(51) Int. Cl.
*G06F 40/134*    (2020.01)
*G06F 16/9535*   (2019.01)
(Continued)

(52) U.S. Cl.
CPC ........ *G06F 40/134* (2020.01); *G06F 16/9535* (2019.01); *G06F 40/137* (2020.01); *G06F 40/35* (2020.01)

(58) Field of Classification Search
CPC .... G06F 40/134; G06F 40/35; G06F 16/9535; G06F 40/137
See application file for complete search history.

(56) References Cited

U.S. PATENT DOCUMENTS 6,493,637 B1 * 12/2002 Steeg ............... G16B 30/10
                                          702/19
7,085,771 B2 * 8/2006 Chung ............... G06F 16/313
                                          707/E17.084
(Continued)

FOREIGN PATENT DOCUMENTS

CN   104598613 B  * 11/2017  ........... G06F 16/211
CN   112925755 A  *  6/2021
(Continued)

OTHER PUBLICATIONS

International Search Report for PCT Application No. PCT/JP2020/007135, mailed on Apr. 21, 2020.
(Continued)

*Primary Examiner* — Benjamin Smith (57) ABSTRACT

A scenario generation apparatus includes: a keyword selection unit that extracts a hierarchical structure from documents that is a basis of a scenarios for use in chatbot and has the hierarchical structure, and selects keywords from the headings in each layer of the extracted hierarchical structure, a link candidate generation unit that generates a first scenario candidate in which a link is set between the keywords and a second scenario candidate in which a link is not set between the keywords, by using documents, an evaluation value calculation unit that calculates an evaluation value for the link for each of the generated first scenario candidate and the second scenario candidate according to a setting rule, and a scenario generation unit that adopts one of the scenario candidates based on the calculated evaluation value and generates the scenario using the adopted scenario candidate.

8 Claims, 5 Drawing Sheets

(51) Int. Cl.
*G06F 40/137* (2020.01)
*G06F 40/35* (2020.01)

(56) References Cited

U.S. PATENT DOCUMENTS

| | | | | |
|---|---|---|---|---|
| 7,137,062 B2* | 11/2006 | Kaufman | G06F 40/258 | 715/255 |
| 7,610,193 B2* | 10/2009 | Sites | G06F 40/242 | 382/229 |
| 8,190,553 B2* | 5/2012 | Routt | B82Y 10/00 | 706/62 |
| 9,542,930 B2* | 1/2017 | Gupta | G10L 25/54 | |
| 9,939,837 B2* | 4/2018 | Acosta Jimenez | G06N 20/00 | |
| 11,023,787 B2* | 6/2021 | Pelov | H04L 51/02 | |
| 11,038,791 B2* | 6/2021 | Tantsura | H04L 45/42 | |
| 11,068,519 B2* | 7/2021 | Duan | G06F 16/334 | |
| 11,321,536 B2* | 5/2022 | Galitsky | G06V 10/761 | |
| 11,397,762 B2* | 7/2022 | Raval Contractor | G06F 40/20 | |
| 11,429,790 B2* | 8/2022 | Finkelshtein | G06V 30/413 | |
| 11,586,827 B2* | 2/2023 | Galitsky | G06F 16/953 | |
| 2003/0074142 A1* | 4/2003 | Steeg | G06F 40/216 | 702/19 |
| 2003/0217335 A1* | 11/2003 | Chung | G06F 40/30 | 707/E17.084 |
| 2007/0033046 A1* | 2/2007 | Sites | G06F 40/232 | 704/257 |
| 2009/0164435 A1* | 6/2009 | Routt | B82Y 10/00 | |
| 2010/0005087 A1* | 1/2010 | Basco | G06F 16/9536 | 707/E17.017 |
| 2012/0306741 A1* | 12/2012 | Gupta | G06T 19/003 | 345/156 |
| 2013/0138429 A1* | 5/2013 | Shen | G06F 16/3338 | 704/9 |
| 2015/0301555 A1* | 10/2015 | Acosta Jimenez | G06F 1/02 | 700/40 |
| 2016/0055843 A1* | 2/2016 | Gupta | G06F 3/017 | 704/260 |
| 2016/0147747 A1* | 5/2016 | Chulinin | G06F 40/268 | 704/7 |
| 2016/0188541 A1* | 6/2016 | Chulinin | G06F 40/295 | 704/8 |
| 2017/0061959 A1* | 3/2017 | Lehman | G10L 15/08 | |
| 2019/0163692 A1* | 5/2019 | Duan | G06F 16/3329 | |
| 2019/0294727 A1 | 9/2019 | Kohlmeier et al. | | |
| 2019/0294728 A1 | 9/2019 | Kohlmeier et al. | | |
| 2020/0125901 A1* | 4/2020 | Pelov | H04L 51/02 | |
| 2020/0134511 A1* | 4/2020 | Ho | G06N 3/08 | |
| 2020/0184155 A1* | 6/2020 | Galitsky | G06F 40/279 | |
| 2020/0257861 A1* | 8/2020 | Galitsky | G06F 40/279 | |
| 2020/0258147 A1* | 8/2020 | Song | G06F 16/285 | |
| 2020/0258181 A1* | 8/2020 | Song | G06Q 40/02 | |
| 2020/0285810 A1* | 9/2020 | Di Rosa | G06N 5/04 | |
| 2021/0049239 A1* | 2/2021 | Li | G06F 40/30 | |
| 2021/0056101 A1* | 2/2021 | Chiticariu | G06F 16/2423 | |
| 2021/0089620 A1* | 3/2021 | Finkelshtein | G10L 15/19 | |
| 2021/0092044 A1* | 3/2021 | Tantsura | H04L 45/34 | |
| 2021/0232613 A1* | 7/2021 | Raval Contractor | G06N 5/02 | |
| 2021/0240775 A1* | 8/2021 | Liu | G06F 16/9035 | |
| 2021/0406473 A1* | 12/2021 | Park | H04L 51/02 | |
| 2022/0083317 A1 | 3/2022 | Ohta et al. | | |

FOREIGN PATENT DOCUMENTS

| | | | |
|---|---|---|---|
| JP | 2001519070 A | * | 3/1998 |
| JP | 2018-032330 A | | 3/2018 |
| JP | 6579637 B | | 9/2019 |
| KR | 20170090633 A | * | 1/2016 |

OTHER PUBLICATIONS

English translation of Written opinion for PCT Application No. PCT/JP2020/007135, mailed on Apr. 21, 2020.

* cited by examiner

SCENARIO GENERATION APPARATUS, SCENARIO GENERATION METHOD, AND COMPUTER-READABLE RECORDING MEDIUM

TECHNICAL FIELD

The invention relates to a scenario generation apparatus and a scenario generation method for generating scenarios for use in chatbot, and further relates to a computer-readable recording medium that has a program for realizing the apparatus and method recorded thereon.

BACKGROUND ART

In recent years, chatbot has been used in call centers of manufacturers and the like. Chatbot is a program that automatically executes a conversation by text or voice. There are two types of chatbot: question-and-answer type and scenario type.

The question-and-answer type chatbot is a chatbot that outputs one answer to the input question when one question is input (see, for example, Patent Documents 1 and 2). In a question-and-answer chatbot, the system extracts keywords from the question, searches for answers from a database prepared in advance using the extracted keywords as a query, and outputs the searched answers. The question-and-answer chatbot is useful when the user wants to ask questions freely.

The scenario-type chatbot is a chatbot that outputs an answer to a question according to a scenario composed of a flow diagram (see, for example, Patent Document 3). In the scenario-based chatbot, when a user selects a question from options presented, the system follows the scenario based on the selected question, identifies the corresponding answer, and outputs the specified answer. The scenario-type chatbot can guide the user to the answer requested by the user. The scenario type chatbot is useful when the content of the inquiry is roughly fixed, such as in a call center.

Further, in the scenario-type chatbot, when a certain answer is reached, if another answer useful for the user can be presented at the same time, the convenience for the user is improved. Therefore, in the scenario, a link is set between the related answers.

LIST OF RELATED ART DOCUMENTS

Patent Document

Patent Document 1: U.S. Patent Application Publication No. 2019/0294727
Patent Document 2: U.S. Patent Application Publication No. 2019/0294728
Patent Document 3: Japanese Patent No. 6579637

SUMMARY OF INVENTION

Problems to be Solved by the Invention

However, in the scenario-type chatbot, if the link is not set properly, the user will follow the link unnecessarily, and it will be difficult for the user to efficiently obtain necessary information. In creating a scenario, since a person usually sets the link manually in consideration of the content, it becomes difficult to set the link appropriately as the amount of information increases. For this reason, it is required to be able to appropriately set the link of the scenario without manually setting it.

An example of an object is to solve the aforementioned problem, and to provide a scenario generation apparatus, a scenario generation method, and a computer-readable recording medium that can set a link automatically in a scenario generation of chatbot.

Means for Solving the Problems

In order to achieve the above-described object, a scenario generation apparatus according to an example aspect of the invention includes:
  a keyword selection unit that extracts a hierarchical structure from documents that is a basis of a scenarios for use in chatbot and has the hierarchical structure, and selects keywords from the headings in each layer of the extracted hierarchical structure,
  a link candidate generation unit that generates a first scenario candidate in which a link is set between the keywords and a second scenario candidate in which a link is not set between the keywords, by using documents,
  an evaluation value calculation unit that calculates an evaluation value for the link for each of the generated first scenario candidate and the second scenario candidate according to a setting rule,
  a scenario generation unit that adopts one of the scenario candidates based on the calculated evaluation value and generates the scenario using the adopted scenario candidate.

In addition, in order to achieve the above-described object, a scenario generation method according to an example aspect of the invention includes:
  a keyword selection step of extracting a hierarchical structure from documents that is a basis of a scenarios for use in chatbot and has the hierarchical structure, and selecting keywords from the headings in each layer of the extracted hierarchical structure,
  a link candidate generation step of generating a first scenario candidate in which a link is set between the keywords and a second scenario candidate in which a link is not set between the keywords, by using documents,
  an evaluation value calculation step of calculating an evaluation value for the link for each of the generated first scenario candidate and the second scenario candidate according to a setting rule,
  a scenario generation step of adopting one of the scenario candidates based on the calculated evaluation value and generating the scenario using the adopted scenario candidate.

Furthermore, in order to achieve the above-described object, a computer readable recording medium according to an example aspect of the invention that includes a program recorded thereon, the program including instructions that cause a computer to carry out:
  a keyword selection step of extracting a hierarchical structure from documents that is a basis of a scenarios for use in chatbot and has the hierarchical structure, and selecting keywords from the headings in each layer of the extracted hierarchical structure,
  a link candidate generation step of generating a first scenario candidate in which a link is set between the keywords and a second scenario candidate in which a link is not set between the keywords, by using documents, an evaluation value calculation step for calculating an evaluation value for the link for each of the generated first scenario candidate and the second scenario candidate according to a setting rule, a scenario generation step of adopting one of the scenario candidates based on the calculated evaluation value and generating the scenario using the adopted scenario candidate.

Advantageous Effects of the Invention

As described above, according to the present invention, it is possible to set a link automatically in a scenario generation of chatbot.

EXAMPLE EMBODIMENTS (Example Embodiment)

The following describes a scenario generation apparatus, a scenario generation method, and a program according to the example embodiment with reference to FIGS. 1 to 5.

[Apparatus Configuration]

Figure 1:
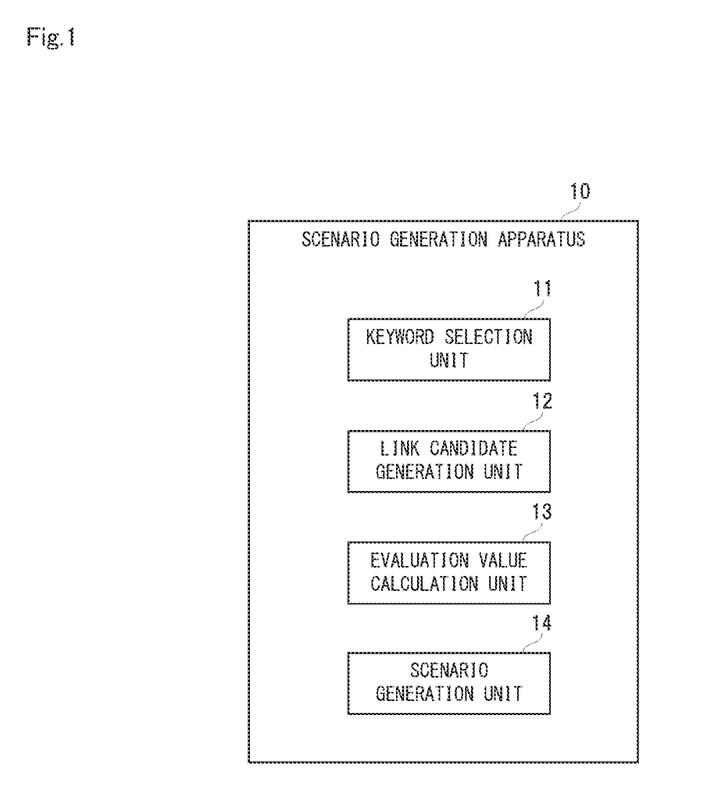
FIG. 1 is a block diagram schematically illustrating a configuration of a scenario generation apparatus according to an example embodiment.

First, the schematic configuration of the scenario generation apparatus in the example embodiment will be described with reference to FIG. 1. FIG. 1 is a block diagram illustrating a schematic configuration of a scenario generation apparatus according to an example embodiment of the present invention.

The scenario generation apparatus 10 according to the example embodiment illustrated in FIG. 1 is an apparatus for generating a scenario of a chatbot. As illustrated in FIG. 1, the scenario generation apparatus 10 according to the example embodiment includes a keyword selection unit 11, a link candidate generation unit 12, an evaluation value calculation unit 13, and a scenario generation unit 14.

In this configuration, the keyword selection unit 11 extracts a hierarchical structure from documents having a hierarchical structure and selects keywords from the headings in each layer of the extracted hierarchical structure. In addition, the documents are the basis of the scenario of the chatbot.

The link candidate generation unit 12 generates a first scenario candidate in which a link is set between the keywords by using the documents. In addition, the link candidate generation unit 12 also generates a second scenario candidate in which a link is not set between the keywords by using documents.

The evaluation value calculation unit 13 calculates a evaluation value for the link for each of the generated first scenario candidate and the generated second scenario candidate according to a setting rule. The scenario generation unit 14 adopts one of the scenario candidates based on the calculated evaluation value and generates the scenario using the adopted scenario candidate.

In this way, in the example embodiment, based on the keywords selected from the headline, the case where there is a link between the keywords and the case where there is no link between the keywords are evaluated, and the link is appropriately set without manual setting. Therefore, according to the example embodiment, the link can be automatically set in the scenario generation of the chatbot.

Figure 2:
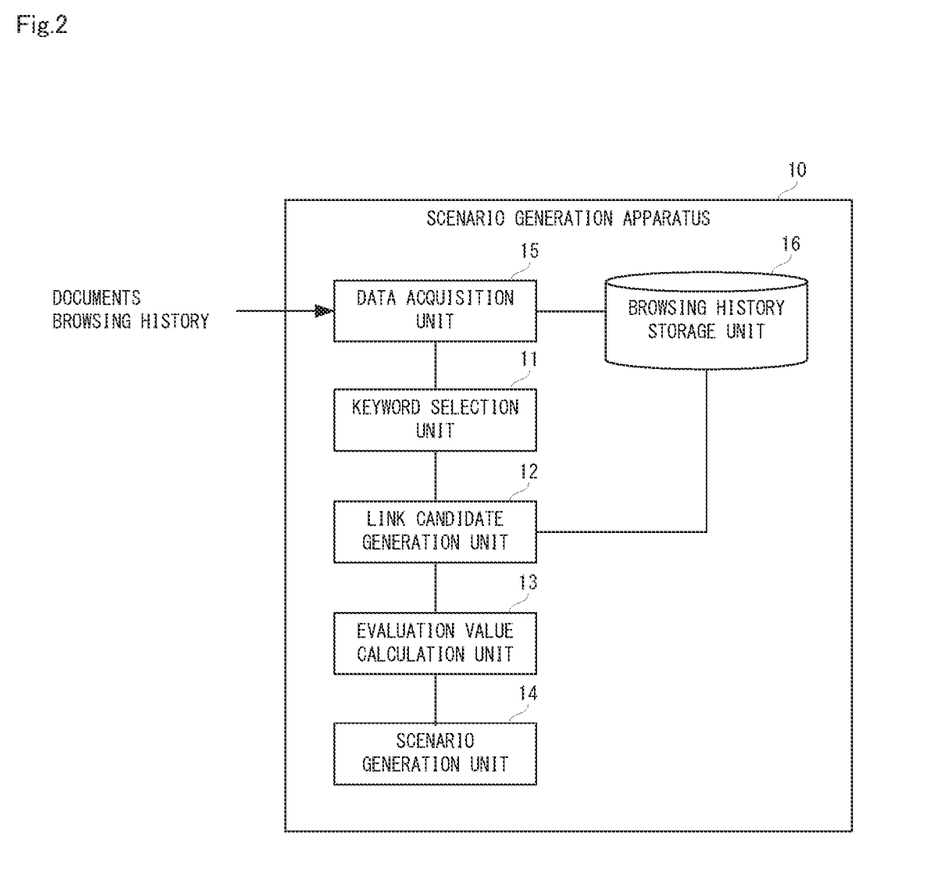
FIG. 2 is a block diagram specifically illustrating the configuration of the scenario generation apparatus according to the example embodiment.

Next, the configuration and function of the scenario generation apparatus 10 according to the example embodiment will be described more specifically with reference to FIGS. 2 to 3. FIG. 2 is a block diagram specifically illustrating the configuration of the scenario generation apparatus according to the example embodiment.

As illustrated in FIG. 2, in the example embodiment, the scenario generation apparatus 10 includes a data acquisition unit 15 and a browsing history storage unit 16, in addition to the keyword selection unit 11, the link candidate generation unit 12, the evaluation value calculation unit 13, and the scenario generation unit 14.

The data acquisition unit 15 acquires documents that are the basis of a chatbot scenario from a device outside the scenario generation device 10, such as a server device, a terminal device, and a storage device, via a network. Then, the data acquisition unit 15 passes the acquired documents to the keyword selection unit 11.

Further, in the example embodiment, the data acquisition unit 15 also acquires the browsing history of the documents that is the basis of the scenario from the above-mentioned device via the network. The data acquisition unit 15 stores the acquired browsing history of the documents (hereinafter referred to as "browsing history") in the browsing history storage unit 16. The browsing history stored in the browsing history storage unit 16 is used for calculating the evaluation value by the evaluation value calculation unit 13.

Figure 3:
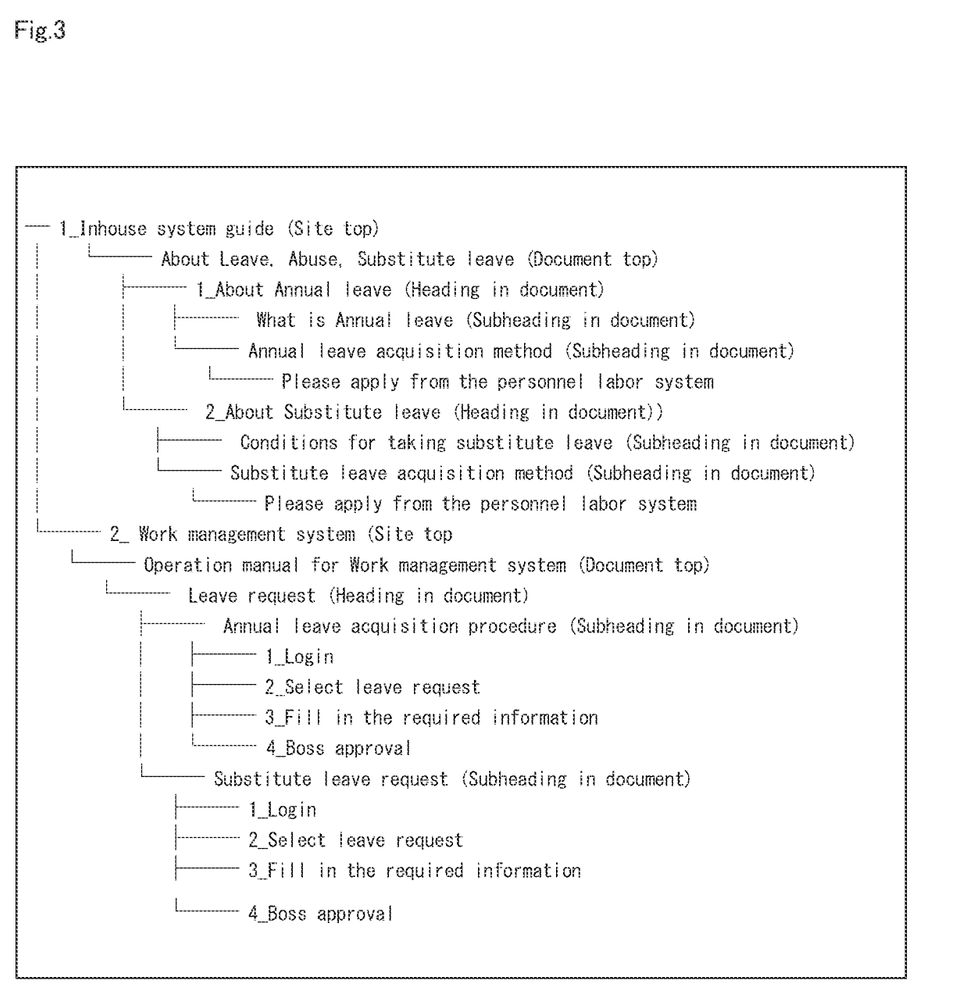
FIG. 3 is a diagram illustrating an example of a hierarchical structure extracted from documents in the example embodiment.

The keyword selection unit 11 extracts, for example, a hierarchical structure as illustrated in FIG. 3. FIG. 3 is a diagram illustrating an example of a hierarchical structure extracted from documents in the example embodiment. FIG. 3 illustrates a case where the documents are in-house manual. In this case, the keyword selection unit 11 selects keywords such as "work management", "annual leave acquisition", "substitute leave acquisition", and "vacation application" from the headings in each layer of the extracted hierarchical structure.

Further, in the example embodiment, the keyword selection unit 11 may select only the keywords satisfying the setting condition when selecting the keywords from the headings of each layer of the hierarchical structure.

As the setting condition, for example, the frequency of appearance is below the threshold. Further, in the example embodiment, after the keyword selection unit 11 selects the keyword, the keyword may be manually filtered according to the setting condition. In these cases, the link candidate generation unit 12 generates the scenario candidates using the filtered keywords.

In the example embodiment, the link candidate generation unit 12 generates the first scenario candidate and the second scenario candidate according to the number of selected keywords. Specifically, assuming that the number of keywords is "n", the link candidate generation unit 12 generates a total of "$2^n$" first scenario candidates and second scenario candidates. For example, assuming that the selected keywords are A, B, and C, the link candidate generation unit 12 generates $2^3$ (=8) scenario candidates as shown in below (there are seven first scenario candidates and one second scenario candidate).

(1) Link between A and A (first scenario candidate)
(2) Link between B and B (first scenario candidate)
(3) Link between C and C (first scenario candidate)
(4) Link between A and B (first scenario candidate)
(5) Link between B and C (first scenario candidate)
(6) Link between C and A (first scenario candidate)
(7) Link between A, B, and C (first scenario candidate)
(8) No link (second scenario candidate)

Further, at this time, the link candidate generation unit 12 sets a link between keywords existing in different branches and generates a first scenario candidate. That is, the link candidate generation unit 12 generates the first scenario candidate without setting a link between the ancestor-descendant relationship. In order to prevent the number of links from increasing too much, the link candidate generation unit 12 can set a link only to the node at the lowest layer when there is a plurality of link destinations in the ancestor-descendant relationship.

In the example embodiment, there is the browsing history for the document. Therefore, the evaluation value calculation unit 13 calculates, as the evaluation value, at least one of the length of the path between headings, the number of choices in the path between headings, and the number of characters in the choices in the path between headings, when browsing history is applied, each of the first scenario candidate and the second scenario candidate.

For example, in the documents that is the basis of the hierarchical structure illustrated in FIG. 3, it is assumed that a browsing history such as "annual leave acquisition method"->"annual leave acquisition procedure" exists. Further, it is assumed that a link is set between the keywords "annual leave acquisition" in one first scenario candidate. In this case, if the browsing history is applied to the first scenario candidate, the path becomes as follows, and the path length becomes "5".

Pass: Root->"1_Inhouse system guide"->"About Leave, Abuse, Substitute leave"->"1 About Annual leave"->"Annual leave acquisition method"->"Annual leave acquisition procedure"

Further, in the above path, the number of choices in each heading is as follows, so that the number of choices existing in the above path is "2+2+2+2+2+4=14". The number of characters existing in the above path is "10+13+10+9+9=51".

"1_In-house system guide": 2 options, 10 characters
"About Leave, Abuse, Substitute leave": 2 options, 13 characters
"1 About Annual leave": 2 options, 10 characters
"Annual leave Acquisition method": 2 options, 9 characters
"Annual leave acquisition procedure": 4 options, 9 characters Further, when the browsing history does not exist for the document, the evaluation value calculation unit 13 sets two groups including a plurality of headings in different branches of the hierarchical structure for each of the first scenario candidate and the second scenario candidate. Then, the evaluation value calculation unit 13 calculates, as the evaluation value, at least one of the length of the path between the two groups, the number of choices in the path between the two groups, and the number of characters in the choices in the path between the two groups, in each scenario candidate.

Specifically, the evaluation value calculation unit 13 sets two groups based on the HTML OL (Ordered List) attribute or the characteristics of the wording (words representing operations and procedures). For example, in the case of the documents that are the basis of the hierarchical structure illustrated in FIG. 3, the evaluation value calculation unit 13 sets "2 About Substitute Leave" and its descendant nodes into one group, and "Substitute Leave Application" and its descendant nodes into other one group. Then, the evaluation value calculation unit 13 calculates at least one of the length of the path between the nodes including the keywords common to the two groups, the number of options existing in the path, and the number of characters in the options existing in the path.

In addition, in the example embodiment, the evaluation value calculation unit 13 can also generate a virtual browsing history when the browsing history does not exist. Specifically, the evaluation value calculation unit 13 selects keywords at random or based on the frequency of appearance and selects headings in order from the upper layer based on the selected keywords. Next, the evaluation value calculation unit 13 randomly replaces the order of the selected headings and uses the obtained result as the browsing history. After that, the evaluation value calculation unit 13 calculates the length of the path or the number of options existing in the path for each of the first scenario candidate and the second scenario candidate in the same manner as when the browsing history exists.

And then, the evaluation value calculation unit 13 can recalculate another type of evaluation value when there are a plurality of scenarios having the same evaluation value as a result of adopting any one of the above-mentioned evaluation values.

In the example embodiment, the scenario generation unit 14 adopts a scenario candidate having the smallest evaluation value, for example, a scenario candidate having the shortest path length, or a scenario candidate having the smallest number of options, and uses the adopted scenario candidate to generate the scenario. Further, the scenario generated by the scenario generation unit 14 is sent to, for example, a system that operates the chatbot.

[Apparatus Operations]

Figure 4:
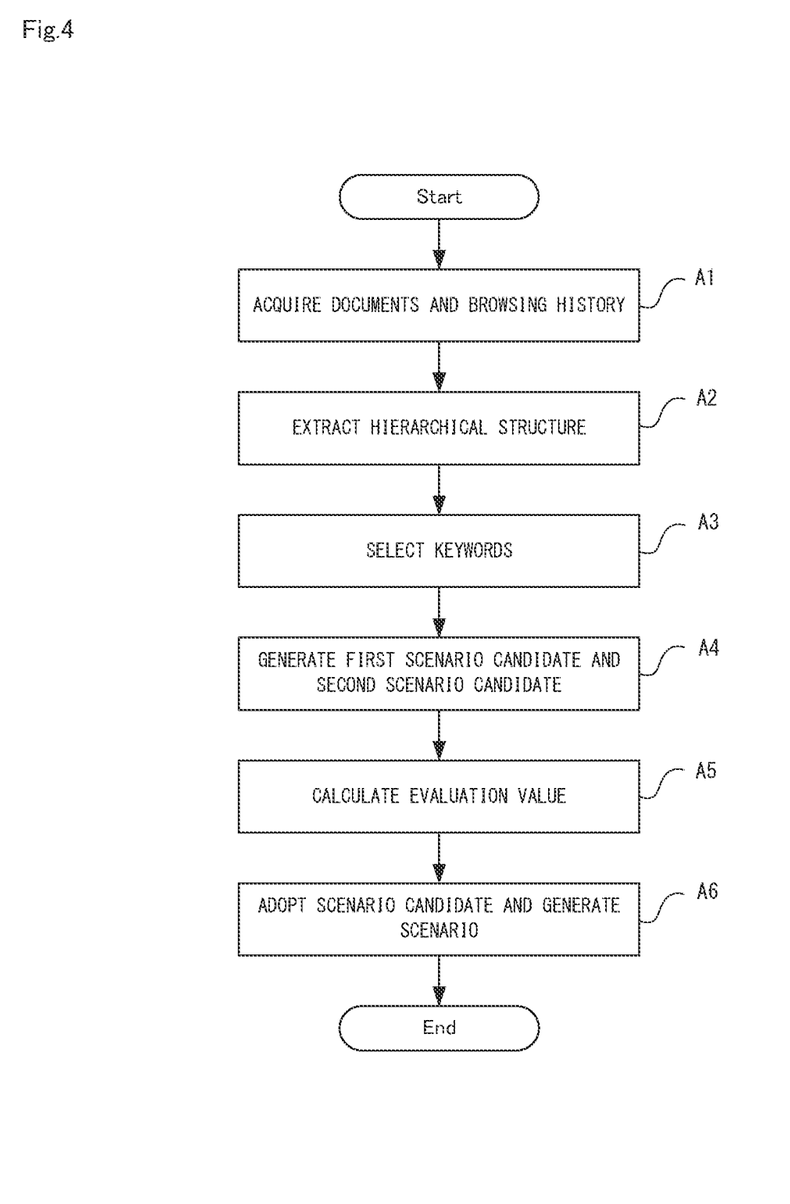
FIG. 4 is a flow diagram illustrating an operation of the scenario generation apparatus according to the example embodiment.

Next, the operation of the scenario generation device 10 according to the example embodiment will be described using FIG. 4. FIG. 4 is a flow diagram illustrating the operation of the scenario generation apparatus according to the example embodiment. In the following description, FIGS. 1 to 3 will be referred to as appropriate. Furthermore, in the example embodiment, the scenario generation method is implemented by operating the scenario generation apparatus 10. Therefore, the following description of the operation of the scenario generation apparatus 10 applies to the scenario generation method according to the example embodiment.

As illustrated in FIG. 4, first, the data acquisition unit 15 acquires the documents based on the scenario of the chatbot and its browsing history from the device outside the scenario generation apparatus 10 via the network. (Step A1). Of these, the documents are passed to the keyword selection unit 11, and the browsing history is stored in the browsing history storage unit 16.

Next, the keyword selection unit 11 extracts the hierarchical structure from the documents acquired in step A1

(step A2). Further, the keyword selection unit 11 selects keywords satisfying the setting conditions from the headings in each layer of the hierarchical structure extracted in step A2 (step A3).

Next, the link candidate generation unit 12 generates the total of r first scenario candidates and second scenario candidates according to the number "n" of keywords selected in step A3 (step A4). In step A4, the link candidate generation unit 12 sets the link between keywords existing in different branches and generates the first scenario candidate. Further, when there is a plurality of link destinations in the ancestor-descendant relationship, the link candidate generation unit 12 sets the link only to the node at the lowest layer.

Next, the evaluation value calculation unit 13 calculates, as the evaluation value, the length of the path between headings, or the number of choices in the path between headings, when browsing history is applied, each of the first scenario candidate and the second scenario candidate (step A5).

After that, the scenario generation unit 14 adopts the scenario candidate having the shortest path length calculated in step A5 or the scenario candidate having the smallest number of options calculated in step A5. The scenario generation unit 14 uses the adopted scenario candidate to generate the scenario (step A6).

As described above, in the example embodiment, a plurality of scenario candidates are evaluated and appropriate links are automatically set. That is, according to the example embodiment, the scenario in which the link is appropriately set is automatically generated. Then, if the chatbot is constructed using the scenario generated in this way, the accuracy of the chatbot can be improved.

(Modified Example)

In the example embodiment, the following example can be used. For example, the link candidate generation unit 12 can also generate the first scenario candidate and the second scenario candidate by using the documents for each keyword selected by the keyword selection unit 11. In this case, the evaluation value calculation unit 13 calculates the evaluation value for the link for each of the first scenario candidate and the second scenario candidate according to the setting rule for each keyword. Further, the scenario generation unit 14 adopts one of the scenario candidates for each keyword based on the calculated evaluation value, and generates the scenario by using all the scenario candidates adopted for each keyword.

That is, in the modified example, the scenario is generated by determining the necessity of the link for each keyword and integrating the obtained determination results of the keywords. In the modified example, evaluation value calculation method is the same as that of the above-mentioned example.

[Program]

It is sufficient that the program according to the example embodiment be a program that causes a computer to execute steps A1 to A6 illustrated in FIG. 4. The scenario generation apparatus 10 and the scenario generation method according to the example embodiment can be realized by installing this program in the computer and executing this program. In this case, the processor of the computer functions and performs processing as the keyword selection unit 11, the link candidate generation unit 12, the evaluation value calculation unit 13, the scenario generation unit 14, and the data acquisition unit 15. In the example embodiment, the browsing history storage unit 16 can be realized by a storage device such as a hard disk provided in the computer.

Also, the program according to the example embodiment may be executed by a computer system constructed by a plurality of computers. In this case, for example, each computer may function as the keyword selection unit 11, the link candidate generation unit 12, the evaluation value calculation unit 13, the scenario generation unit 14, and the data acquisition unit 15. Further, the browsing history storage unit 16 may be constructed on a computer different from the computer that executes the program according to the example embodiment.

Figure 5:
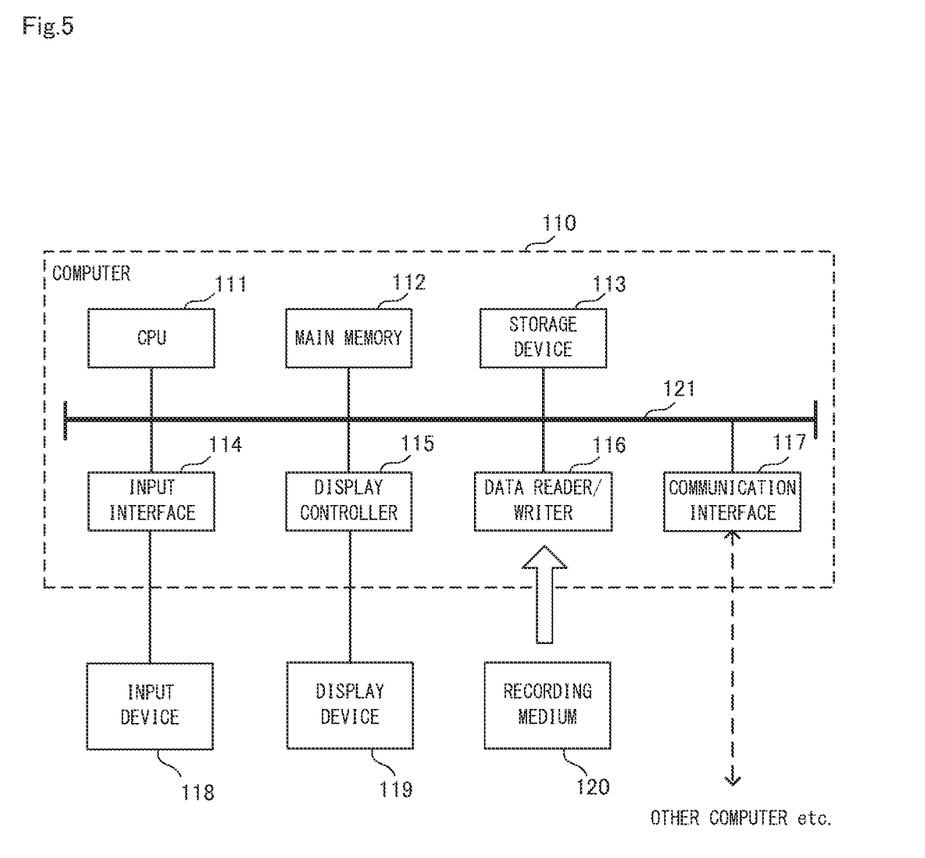
FIG. 5 is a block diagram illustrating an example of a computer that realizes the scenario generation apparatus according to the example embodiment.

Here, Using FIG. 5, a description is now given of a computer that realizes the scenario generation apparatus 10 by executing the program according to the example embodiment. FIG. 5 is a block diagram illustrating an example of the computer that realizes the scenario generation apparatus according to the example embodiment.

As illustrated in FIG. 5, a computer 110 includes a central processing unit (CPU) 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the example embodiment, which is stored in the storage device 113, onto the main memory 112, and performs various computations by executing these codes in a predetermined order. The main memory 112 is typically a volatile storage device such as a dynamic random-access memory (DRAM). Furthermore, the program in the example embodiment is provided in a state such that the program is stored in a computer readable recording medium 120. Note that the program in the example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the scenario generation 10 in the example embodiment can also be realized by using pieces of hardware corresponding to the respective units, rather than using a computer on which the program is installed. Furthermore, a part of the scenario generation apparatus 10 may be realized by using the program, and the remaining part of the scenario generation apparatus 10 may be realized by using hardware.

While a part of or the entirety of the above-described example embodiment can be expressed by (Supplementary note 1) to (Supplementary note 21) described in the following, the invention is not limited to the following description.

(Supplementary Note 1)

A scenario generation apparatus including:

a keyword selection unit configured to extract a hierarchical structure from documents that is a basis of a scenarios for use in chatbot and has the hierarchical structure, and select keywords from the headings in each layer of the extracted hierarchical structure, a link candidate generation unit configured to generate a first scenario candidate in which a link is set between the keywords and a second scenario candidate in which a link is not set between the keywords, by using documents, an evaluation value calculation unit configured to calculate an evaluation value for the link for each of the generated first scenario candidate and the second scenario candidate according to a setting rule, a scenario generation unit configured to adopt one of the scenario candidates based on the calculated evaluation value and generate the scenario using the adopted scenario candidate.

(Supplementary Note 2)

The scenario generation apparatus according to Supplementary note 1, wherein the link candidate generation unit generates the first scenario candidate and the second scenario candidate according to the number of selected keywords.

(Supplementary Note 3)

The scenario generation apparatus according to Supplementary note 1, wherein link candidate generation unit generates, for each of the selected keywords, the first scenario candidate in which the link is set between the keywords and the second scenario candidate in which the link is not set between the keywords, by using documents, the evaluation value calculation unit calculates the evaluation value for the link for each of the first scenario candidate generated for each of the keywords and the second scenario candidate generated for each of the keywords, according to the setting rule, the scenario generation unit adopts one of the scenario candidates based on the calculated evaluation value for each of the keyword and generates the scenario using the adopted scenario candidate for each of the keywords.

(Supplementary Note 4)

The scenario generation apparatus according to any one of Supplementary notes 1 to 3, wherein, if there is a browsing history for the documents, the evaluation value calculation unit calculates, at least one of a length of a path between the headings, the number of options existing in the path between the headings, and the number of characters in the options existing in the path between the headings, in case of applying the browsing history to the first scenario candidate and the second scenario candidate, as the evaluation value, the scenario generation unit adopts the scenario candidate having the smallest evaluation value.

(Supplementary Note 5)

The scenario generation apparatus according to any one of Supplementary notes 1 to 3, wherein, if there is no browsing history for the documents, the evaluation value calculation unit sets, for each of the first scenario candidate and the second scenario candidate, two groups including the plurality of headings in different branches of the hierarchical structure, the evaluation value calculation unit calculates, for each of the first scenario candidate and the second scenario candidate, at least one of a length of a path between the groups, the number of options existing in the path between the groups, and the number of characters in the options existing in the path between the groups, as the evaluation value, the scenario generation unit adopts the scenario candidate having the smallest evaluation value.

(Supplementary Note 6)

The scenario generation apparatus according to any one of Supplementary notes 1 to 5, wherein the link candidate generation unit generates the first scenario candidate by setting a link between keywords which exist in different branches.

(Supplementary Note 7)

The scenario generation apparatus according to any one of Supplementary notes 1 to 6, wherein the keyword selection unit selects keywords satisfying a setting condition from the heading.

(Supplementary Note 8)

A scenario generation method including:

a keyword selection step of extracting a hierarchical structure from documents that is a basis of a scenarios for use in chatbot and has the hierarchical structure, and selecting keywords from the headings in each layer of the extracted hierarchical structure, a link candidate generation step of generating a first scenario candidate in which a link is set between the keywords and a second scenario candidate in which a link is not set between the keywords, by using documents, an evaluation value calculation step of calculating an evaluation value for the link for each of the generated first scenario candidate and the second scenario candidate according to a setting rule, a scenario generation step of adopting one of the scenario candidates based on the calculated evaluation value and generating the scenario using the adopted scenario candidate.

(Supplementary Note 9)

The scenario generation method according to Supplementary note 8, wherein, in the link candidate generation step, generating the first scenario candidate and the second scenario candidate according to the number of selected keywords.

(Supplementary Note 10)

The scenario generation method according to Supplementary note 8, wherein, in the link candidate generation step, generating, for each of the selected keywords, the first scenario candidate in which the link is set between the keywords and the second scenario candidate in which the link is not set between the keywords, by using documents, in the evaluation value calculation step, calculating the evaluation value for the link for each of the first scenario candidate generated for each of the keywords and the second scenario candidate generated for each of the keywords, according to the setting rule, in the scenario generation step, adopting one of the scenario candidates based on the calculated evaluation value for each of the keyword and generating the scenario using the adopted scenario candidate for each of the keywords.

(Supplementary Note 11)

11. The scenario generation method according to any one of Supplementary notes 8 to 10, wherein, if there is a browsing history for the documents, in the evaluation value calculation step, calculating, at least one of a length of a path between the headings, the number of options existing in the path between the headings, and the number of characters in the options existing in the path between the headings, in case of applying the browsing history to the first scenario candidate and the second scenario candidate, as the evaluation value, in the scenario generation step, adopting the scenario candidate having the smallest evaluation value.

(Supplementary Note 12)

12. The scenario generation method according to any one of Supplementary notes 8 to 10, wherein, if there is no browsing history for the documents, in the evaluation value calculation step, setting, for each of the first scenario candidate and the second scenario candidate, two groups including the plurality of headings in different branches of the hierarchical structure, in the evaluation value calculation step, calculating, for each of the first scenario candidate and the second scenario candidate, at least one of a length of a path between the groups, the number of options existing in the path between the groups, and the number of characters in the options existing in the path between the groups, as the evaluation value, in the scenario generation step, adopting the scenario candidate having the smallest evaluation value.

(Supplementary Note 13)

The scenario generation method according to any one of Supplementary notes 8 to 12, wherein, in the link candidate generation step, generating the first scenario candidate by setting a link between keywords which exist in different branches.

(Supplementary Note 14)

The scenario generation method according to any one of Supplementary notes 8 to 13, wherein, in the keyword selection step, selecting keywords satisfying a setting condition from the heading.

(Supplementary Note 15)

A computer-readable recording medium that includes a program, the program including instructions that cause a computer to carry out:

a keyword selection step of extracting a hierarchical structure from documents that is a basis of a scenarios for use in chatbot and has the hierarchical structure, and selecting keywords from the headings in each layer of the extracted hierarchical structure, a link candidate generation step of generating a first scenario candidate in which a link is set between the keywords and a second scenario candidate in which a link is not set between the keywords, by using documents, an evaluation value calculation step of calculating an evaluation value for the link for each of the generated first scenario candidate and the second scenario candidate according to a setting rule, a scenario generation step of adopting one of the scenario candidates based on the calculated evaluation value and generating the scenario using the adopted scenario candidate.

(Supplementary Note 16)

The computer-readable recording medium according to Supplementary note 15, wherein, in the link candidate generation step, generating the first scenario candidate and the second scenario candidate according to the number of selected keywords.

(Supplementary Note 17)

The computer-readable recording medium according to Supplementary note 15, wherein, in the link candidate generation step, generating, for each of the selected keywords, the first scenario candidate in which the link is set between the keywords and the second scenario candidate in which the link is not set between the keywords, by using documents, in the evaluation value calculation step, calculating the evaluation value for the link for each of the first scenario candidate generated for each of the keywords and the second scenario candidate generated for each of the keywords, according to the setting rule, in the scenario generation step, adopting one of the scenario candidates based on the calculated evaluation value for each of the keyword and generating the scenario using the adopted scenario candidate for each of the keywords.

(Supplementary Note 18)

The computer-readable recording medium according to any one of Supplementary notes 15 to 17, wherein, if there is a browsing history for the documents, in the evaluation value calculation step, calculating, at least one of a length of a path between the headings, the number of options existing in the path between the headings, and the number of characters in the options existing in the path between the headings, in case of applying the browsing history to the first scenario candidate and the second scenario candidate, as the evaluation value, in the scenario generation step, adopting the scenario candidate having the smallest evaluation value.

(Supplementary Note 19)

The computer-readable recording medium according to any one of Supplementary notes 15 to 17, wherein, if there is no browsing history for the documents, in the evaluation value calculation step, setting, for each of the first scenario candidate and the second scenario candidate, two groups including the plurality of headings in different branches of the hierarchical structure, in the evaluation value calculation step, calculating, for each of the first scenario candidate and the second scenario candidate, at least one of a length of a path between the groups, the number of options existing in the path between the groups, and the number of characters in the options existing in the path between the groups, as the evaluation value, in the scenario generation step, adopting the scenario candidate having the smallest evaluation value.

(Supplementary Note 20)

The computer-readable recording medium according to any one of Supplementary notes 15 to 19, wherein, in the link candidate generation step, generating the first scenario candidate by setting a link between keywords which exist in different branches.

(Supplementary Note 21)

The computer-readable recording medium according to any one of Supplementary notes 15 to 20, wherein, in the keyword selection step, selecting keywords satisfying a setting condition from the heading.

The invention has been described with reference to an example embodiment above, but the invention is not limited to the above-described example embodiment. Within the scope of the invention, various changes that could be understood by a person skilled in the art could be applied to the configurations and details of the invention.

INDUSTRIAL APPLICABILITY

As described above, according to the present invention, it is possible to set the link automatically in the scenario generation of chatbot. The present invention is useful for a system that realizes a chatbot.

LIST OF REFERENCE SIGNS

10 Scenario generation apparatus
11 Keyword selection unit
12 Link candidate generation unit
13 Evaluation value calculation unit
14 Scenario generation unit
15 Data acquisition unit
16 Browsing history storage unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A scenario generation apparatus comprising:

at least one memory storing instructions; and at least one processor configured to execute the instructions to:

extract a hierarchical structure from documents that form a basis of scenarios for use in a chatbot and that have the hierarchical structure, and select keywords from headings in each of a plurality of layers of the extracted hierarchical structure, wherein a number n of the selected keywords is 2 or more, generate first scenario candidates in which a link is set between the keywords and a second scenario candidate in which the link is not set between the keywords, by using the documents, wherein the first scenario candidates include scenario candidates having a type of the link between the keywords and scenario candidates having a plurality of types of the link between the keywords, calculate an evaluation value for the first scenario candidates and the second scenario candidate according to a setting rule, wherein a total of number of the scenario candidates is equal to $2^n$, adopt, from the first scenario candidates and the second scenario candidates, a scenario candidate based on the calculated evaluation value, and generate the scenario using the adopted scenario candidate, calculate at least one of a length of a path between the headings, a number of options existing in the path between the headings, and a number of characters in options existing in the path between the headings, by applying a browsing history for the documents to the first scenario candidates and the second scenario candidate, as the evaluation value, wherein the scenario candidate having a smallest evaluation value is adopted, wherein the first scenario candidates are generated by setting the link between keywords that exist in different branches.

2. The scenario generation apparatus according to claim 1, wherein the first scenario candidates and the second scenario candidate are generated for each of the keywords, the evaluation value is calculated for each of the keywords, and one scenario candidate is adopted for each of the keywords.

3. The scenario generation apparatus according to claim 1, wherein the keywords satisfying a setting condition are selected from the heading.

4. A scenario generation method comprising:

extracting, by a processor, a hierarchical structure from documents that form a basis of scenarios for use in a chatbot and that have the hierarchical structure, and select keywords from headings in each of a plurality of layers of the extracted hierarchical structure, wherein a number n of the selected keywords is 2 or more, generating, by the processor, 1 first scenario candidates in which a link is set between the keywords and a second scenario candidate in which the link is not set between the keywords, by using the documents, wherein the first scenario candidates include scenario candidates having a type of the link between the keywords and scenario candidates having a plurality of types of the link between the keywords, calculating, by the processor, an evaluation value for the first scenario candidates and the second scenario candidate according to a setting rule, wherein a total of number of the scenario candidates is equal to $2^n$, adopting, by the processor and from the first scenario candidates and the second scenario candidate, a scenario candidate based on the calculated evaluation value, yielding a plurality of adopted scenario candidates, and generating the scenario using the adopted scenario candidate, calculating, by the processor, at least one of a length of a path between the headings, a number of options existing in the path between the headings, and a number of characters in options existing in the path between the headings, by applying a browsing history for the documents to the first scenario candidates and the second scenario candidate, as the evaluation value, wherein the scenario candidate having a smallest evaluation value is adopted, wherein the first scenario candidates are generated by setting the link between keywords that exist in different branches.

5. The scenario generation method according to claim 4, wherein the first scenario candidates and the second scenario candidate are generated for each of the keywords, the evaluation value is calculated for each of the keywords, and one scenario candidate is adopted for each of the keywords.

6. The scenario generation method according to claim 4, wherein the keywords satisfying a setting condition are selected from the heading.

7. A non-transitory computer-readable recording medium storing a program executable by a computer to cause the computer to perform:

extracting a hierarchical structure from documents that form a basis of scenarios for use in a chatbot and that have the hierarchical structure, and select keywords from headings in each of a plurality of layers of the extracted hierarchical structure, wherein a number n of the selected keywords is 2 or more, generating first scenario candidates in which a link is set between the keywords and a second scenario candidate in which the link is not set between the keywords, by using the documents, wherein the first scenario candidates include scenario candidates having a type of the link between the keywords and scenario candidates having a plurality of types of the link between the keywords, calculating an evaluation value for the first scenario candidates and the second scenario candidate according to a setting rule, wherein a total of number of the scenario candidates is equal to $2^n$, adopting, from the first scenario candidates and the second scenario candidate, a scenario candidate based on the calculated evaluation value, yielding a plurality of adopted scenario candidates, and generating the scenario using the adopted scenario candidate, calculating at least one of a length of a path between the headings, a number of options existing in the path between the headings, and a number of characters in options existing in the path between the headings, by applying the browsing history to the first scenario candidates and the second scenario candidate, as the evaluation value, wherein the scenario candidate having a smallest evaluation value is adopted, wherein the first scenario candidates are generated by setting the link between keywords that exist in different branches.

8. The non-transitory computer-readable recording medium according to claim 7, wherein the first scenario candidates and the second scenario candidate are generated for each of the keywords, the evaluation value is calculated for each of the keywords, and one scenario candidate is adopted for each of the keywords.

* * * * *